United States Patent [19]
Levy

[11] Patent Number: 6,037,882
[45] Date of Patent: Mar. 14, 2000

[54] METHOD AND APPARATUS FOR INPUTTING DATA TO AN ELECTRONIC SYSTEM

[76] Inventor: David H. Levy, 16 Blake St., Cambridge, Mass. 02140

[21] Appl. No.: 08/940,222

[22] Filed: Sep. 30, 1997

[51] Int. Cl.[7] ................................................. H04Q 1/00
[52] U.S. Cl. .................. 341/20; 340/825.56; 345/168
[58] Field of Search ..................... 341/20, 22; 345/158, 345/157, 355, 179, 168; 340/407.1, 825.56

[56] References Cited

U.S. PATENT DOCUMENTS

| | | | |
|---|---|---|---|
| 4,562,304 | 12/1985 | Ward et al. ............................ | 178/18.01 |
| 5,212,372 | 5/1993 | Quick ....................................... | 235/472 |
| 5,261,079 | 11/1993 | Celi, Jr. ................................... | 395/500 |
| 5,311,175 | 5/1994 | Waldman ................................. | 341/34 |
| 5,457,454 | 10/1995 | Sugano ..................................... | 341/22 |
| 5,488,362 | 1/1996 | Ullman ..................................... | 341/20 |
| 5,583,478 | 12/1996 | Renzi .................................... | 340/407.1 |
| 5,594,469 | 1/1997 | Freeman ................................. | 345/158 |
| 5,638,092 | 6/1997 | Eng ......................................... | 345/158 |

*Primary Examiner*—Michael Horabik
*Assistant Examiner*—Albert K. Wong

[57] ABSTRACT

A method and apparatus for inputting data to an electronic system. The method includes the steps of generating a representation of an input device having a plurality of input options in virtual space, sensing the position of a user in real space, and displaying the representation of the input device and the position of the user in virtual space relative to the representation of the input device on a head-mounted display. The method further includes the steps of sensing selection of one of the plurality of input options by the user and determining which of the plurality of input options the user's selected in response to the position of the user in virtual space relative to the representation of the input device. In one embodiment, the representation of an input device is a representation of a keyboard. In another embodiment, the position of the user's finger is sensed. In one such embodiment, a finger-shaped cursor is used to display the position of the user's finger. The apparatus includes a sensor, a processor in communication with the sensor, and a head-mounted display in communication with the processor. The processor executes an algorithm which includes a module generating a representation of an input device in virtual space, a module determining a position of the user in virtual space relative to the representation of the input device; and a module determining which of the plurality of input options the user selects in response to the user's position.

2 Claims, 6 Drawing Sheets

METHOD AND APPARATUS FOR INPUTTING DATA TO AN ELECTRONIC SYSTEM

FIELD OF THE INVENTION

This invention relates generally to a method and apparatus for inputting data to an electronic system and more specifically to a method and apparatus for providing keyboard and/or cursor control input to a computer system in which the primary display is mounted on the user's head, as in augmented and virtual reality applications.

BACKGROUND OF THE INVENTION

Wearable computing technology is currently a technology used primarily by researchers. The users of wearable computing technology typically carry sophisticated computers having communication ability on their bodies throughout the day, which provides the users with constant access to personal data, general data and written communication. The output from a wearable computer may be viewed on a miniature video display which may be worn over a user's eye, thereby providing the user constant access to both the real and virtual worlds. Such a scheme is known as augmented reality. Data is typically entered into the computer through a small hand-held chorded keyboard, several of which are known in the art. Chorded keyboards have a small number of keys which are pressed in combination, similar to playing a musical instrument. As chorded keyboards are operated by touch, there is no need to view a chorded keyboard to operate it.

As wearable computers become more common, there may be resistance to chorded keyboards, as chorded keyboards may be difficult to use and take time to learn. One solution is to use a miniature traditional keyboard, perhaps a miniature keyboard capable of being worn on one of the user's wrists. Using a miniature traditional keyboard, however, presents a problem to augmented reality applications because the user must shift gaze from the display located on the user's eye, to the keyboard in the user's hand on a near-constant basis. This problem is addressed by the instant invention.

One known input apparatus which reduces the necessity for the user to shift gaze includes a two-level keypad system. Each key of the two-level keypad system may be depressed to two different levels. When a user depresses a key of the two-level keypad system to the first level, the system identifies the functionality of the key to the user without actuating the key. When the user further depresses the key to the second level, the system performs the function of the key. This two-level keypad system, however, does not identify to the user the position of the user's finger relative to the two-level keypad unless the user depresses one of the keys to its first level. This two-level keypad system also does not continuously identify the position of the user's finger relative to the two-level keypad as a user transitions between keys.

What is desired then is an apparatus for inputting data to an electronic system which continuously identifies to the user which data will be input to the electronic system, without requiring the user to view the input device or to learn a new keyboard method. It is also desirable to provide an apparatus for inputting data to an electronic system which allows a user to toggle between input modes, such as between a mouse input mode and a keyboard input mode. The present invention permits such functionality.

SUMMARY OF THE INVENTION

The invention relates to a method for inputting data to an electronic system. The method includes the steps of generating a representation of an input device having a plurality of input options in virtual space, sensing the position of a user in real space, and displaying the representation of the input device and the position of the user in virtual space on a head-mounted display. The method further includes the steps of determining selection of one of the plurality of input options by the user and determining which of the plurality of input options the user selected in response to the position of the user in virtual space relative to the representation of the input device. In one embodiment, the electronic system is a computer system. In another embodiment, the representation of the input device is a representation of a keyboard. In yet another embodiment, the position of the user's finger is sensed. In one embodiment in which the position of the user's finger is sensed, a finger-shaped cursor is used to display the position of the user's finger.

The invention also relates to an apparatus for inputting data to an electronic system. The apparatus includes a sensor, a processor in communication with the sensor, and a head-mounted display in communication with the processor. The sensor senses the position of the user in real space. The processor executes an algorithm which includes a module generating a representation of an input device having a plurality of input options in virtual space, a module determining the position of the user in virtual space relative to the representation of the input device, and a module determining which of the plurality of input options the user selects in response to the user's position. The head-mounted display displays the representation of the input device and the position of the user in virtual space relative to the representation of the input device. In one embodiment, the sensor senses the position of the user's finger. In one such embodiment, the head-mounted display displays the position of the user's finger using a finger-shaped cursor. In another embodiment, the sensor senses the orientation of the user's finger in real space and the head-mounted display displays the orientation of the user's finger by varying the orientation of the finger-shaped cursor. In yet another embodiment, the sensor simultaneously senses the position of more than one of the user's fingers. In this embodiment, the apparatus independently tracks the position of more than one user finger at a time.

The invention also relates to a method for toggling between a first input mode and a second input mode in an electronic system. The method includes the steps of providing an electronic system having a first input mode and a second input mode, providing a sensor capable of distinguishing between a single user finger and a plurality of user fingers, placing the electronic system in the first input mode upon sensing only the single user finger, and placing the electronic system in the second input mode upon sensing the plurality of user fingers. In one embodiment, the first input mode is a keyboard input mode and the second input mode is a mouse input mode.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
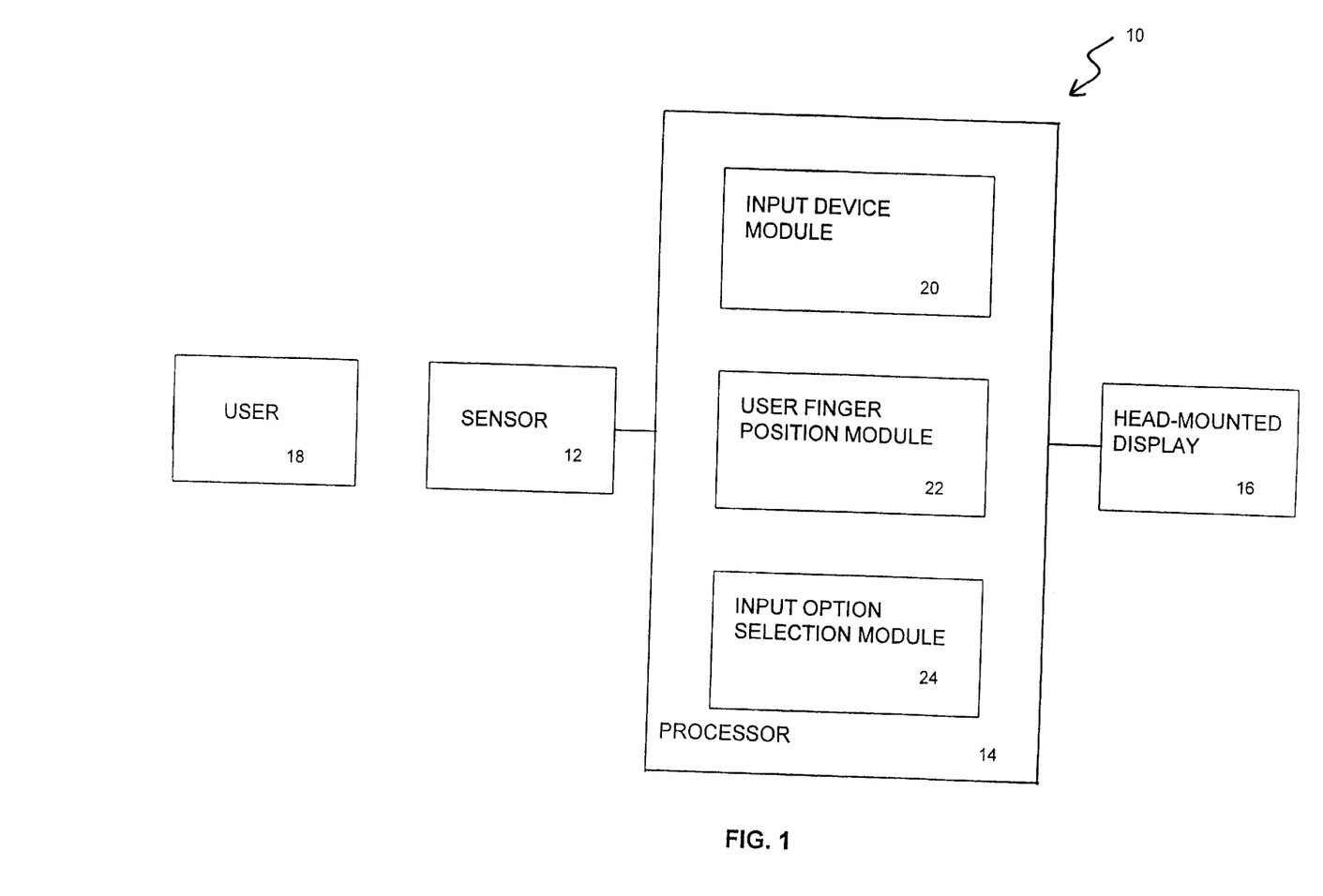
FIG. 1 is a block diagram of an embodiment of a system for inputting data to an electronic system.

In brief overview, and referring to FIG. 1, an embodiment of an apparatus 10 for inputting data to an electronic system includes a sensor 12, a processor 14, and a head-mounted display 16. In one embodiment, the electronic system is a computer system. In another embodiment the electronic system is a CD ROM access system. The sensor 12 senses the position of the user 18 in real space. As used herein, "real space" is defined as the real world environment. In one embodiment, the sensor 12 senses the continuous position of the user 18 in real space. In another embodiment, the sensor 12 senses the position of a user's finger in real space in two dimensions. In another embodiment, the sensor 12 senses the position of the user's finger in three dimensions. In yet another embodiment, the sensor 12 also senses the orientation of the user's finger in real space. In still another embodiment, the sensor 12 simultaneously senses the position of each of a plurality of the user's fingers in real space. While embodiments of the sensor 12 for sensing the position of a user's finger will be described in detail below in the discussion of FIGS. 3 through 7 and 10A through 13, it is possible for embodiments of the sensor 12 to sense the position of other parts of the user's body.

In one embodiment, the sensor 12 includes a position sensor and a selection sensor. The position sensor senses the position of the user's finger in at least two dimensions (XY) and reports this XY position data to the processor 14 where it is used to drive a cursor that mimics finger motion on the head-mounted display 16. The selection sensor senses when the user selects one of the plurality of input options to be input to the electronic system and reports this selection information to the processor 14.

The processor 14 is in communication with the sensor 12 and receives a signal from the sensor 12 indicating the position of the user 18 in real space. The processor 14 may be in wired or wireless communication with the sensor 12. The processor 14 executes an algorithm to enable the user 18 to input data to an electronic system. The algorithm includes an input device module 20, a user position module 22, and an input option selection module 24. The input device module 20 generates a representation of an input device in virtual space. As used herein, "virtual space" is defined as the processor-generated virtual environment with which the user 18 can interact. The representation of the input device includes a plurality of input options which the user 18 may select As used herein, "input options" are defined as the data the user may select to input into the electronic system or the functions which the user may select the electronic system to perform. In one embodiment, the representation of the input device is a representation of a traditional alphanumeric keyboard. In this embodiment, the plurality of input options includes the keys of the keyboard which may be selected by the user 18. In another embodiment, the input device module 20 may also generate a set of "pull-down" menus from which the user may select a function. In one embodiment, the processor 14 is a computer processor and the algorithm is implemented through software.

The user position module 22 determines the position of the user 18 in virtual space relative to the representation of the input device generated by the input device module 20. The user position module 22 utilizes the information obtained by the sensor 12 to determine the position of the user 18 in virtual space. In an embodiment in which the sensor 12 senses the continuous position of the user 18 in real space, the position module 22 determines the continuous position of the user 18 in virtual space. In an embodiment in which the sensor 12 senses the position of the user's finger, the position module 22 determines the position of the user's finger in virtual space relative to the representation of the input device. In an embodiment in which the sensor 12 senses the position of a plurality of user fingers, the position module 22 determines the position of each of the plurality of user's fingers in virtual space relative to the representation of the input device generated by the input device module 20.

The input option selection module 24 determines when the user 18 selects one of the plurality of input options of the representation of the input device and also determines which of the plurality of input options the user 18 selects. The input option selection module 24 utilizes the information obtained by the sensor 12 regarding the position of the user 18 and information from the user position module 22 regarding the position of the user 18 in virtual space relative to the representation of the input device to determine when an input option is selected by the user 18 and which input option is selected. One method by which the input option selection module 24 makes these determinations is discussed in detail below in the description of FIG. 8.

There are several ways to implement wireless communication between the sensor 12 and the processor 14. One method is to modulate the electric field of the body of the user 18 (body LAN). This method reduces the cost of the system through the elimination of a dedicated keyboard receiver. Within this category are several techniques. Transmitted data may include absolute or relative XY location data, or specific key location as determined by known sensing technologies. A novel sensing technology is to incorporate the body LAN as a finger location identification means. This is accomplished by providing a number of discrete transmitter points (electrodes) at or below the contact surface of an intended virtual keypad. Each transmitter point provides a distinct signal. The body LAN can detect finger position by measuring the strength of signal with respect to each transmitter point. Other techniques such as infrared or magnetic field communication may also be used.

The head-mounted display 16 is in communication with the processor 14 and displays the representation of the input device and the position of the user in virtual space relative to the representation of the input device. In one embodiment, the head-mounted display 16 displays the continuous position of the user 18 in virtual space relative to the representation of the input device. The head-mounted display 16 may be in wired or wireless communication with the processor 14. In one embodiment, the head-mounted display 16 is a miniature video display that may be worn over one of the user's eyes. In one such embodiment, the miniature video display is integrated into a pair of glasses that may be worn by the user. In another embodiment, the video display is integrated into a contact lens. In one embodiment in which the sensor 12 senses the position of the user's finger, the head-mounted display 16 displays the position of the user's finger using a finger-shaped cursor. When the position of the user's finger in virtual space intersects the representation of the input device, in one embodiment, the head-mounted display 16 superimposes the finger-shaped cursor onto the representation of the input device. For example, if the representation of the input device is a representation of a keyboard, the head-mounted display 16 superimposes the finger-shaped cursor onto the representation of the keyboard. In an embodiment in which the sensor 12 also senses the orientation of the user's finger in real space, the head-mounted display 16 also displays the orientation of the user's finger in virtual space relative to the representation of the input device. In yet another embodiment, the head-mounted display 16 displays the orientation of the user's finger by varying the orientation of a finger-shaped cursor with respect to the representation of the input device. In an embodiment in which the sensor 12 senses the position of a plurality of user fingers, the head-mounted display 16 displays the position of each of the plurality of user fingers. In other embodiments, the head-mounted display 16 may be replaced by a display that is not worn on the user's head. By displaying the position of the user's finger relative to the representation of the input device, the user receives feedback as to the location of the finger without being forced to look away from the image on the display.

In another embodiment in which the user is inputting keys from a keyboard, the representation of the virtual keyboard is omitted from the head-mounted display 16. As the position of the user's finger changes, the active letter at the cursor on the head-mounted display position changes accordingly. When the correct letter appears, the user selects the key. Through repetition, the user learns to touch type with the added benefit of constant feedback.

Figure 2:
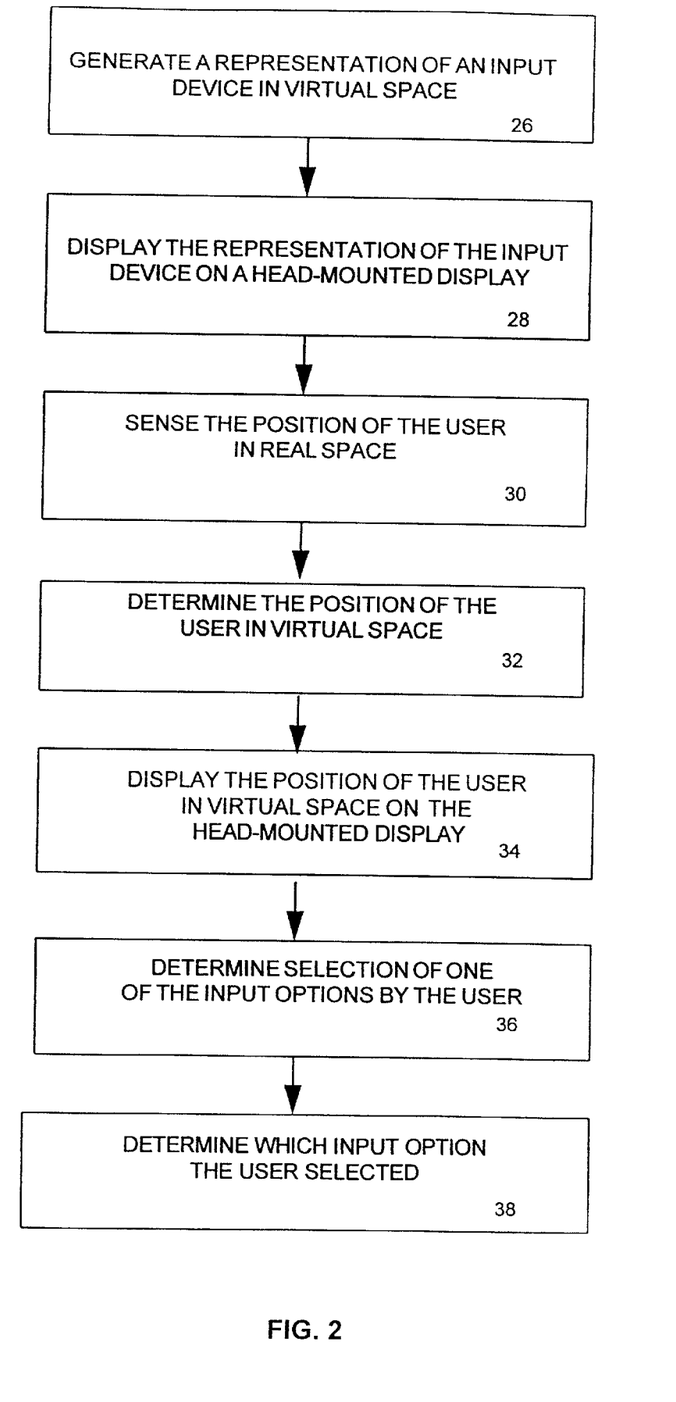
FIG. 2 is a flowchart representation of an embodiment of a process for inputting data to an electronic system.

The flowchart of FIG. 2 shows the steps performed by the apparatus 10 described above and shown in FIG. 1, for inputting data to an electronic system. In step 26, the processor 14 generates a representation of an input device in virtual space. As described above, in one embodiment, the representation of the input device is a representation of a traditional alphanumeric keyboard having a plurality of keys. In step 28, the head-mounted display 16 displays the representation of the input device to the user 18. In step 30, the sensor 12 senses the position of the user in real space and sends a signal to the processor 14 indicating the position of the user in real space. After receiving the information from the sensor 12 regarding the position of the user, in step 32 the processor 14 determines the position of the user in virtual space. In step 34, the head-mounted display 16 displays the continuous position of the user in virtual space relative to the representation of the input device. The processor 14 determines selection of one of the input options (step 36) and determines which of the input options the user selects (step 38) in response to the position of the user in virtual space relative to the representation of the input device.

Figure 3:
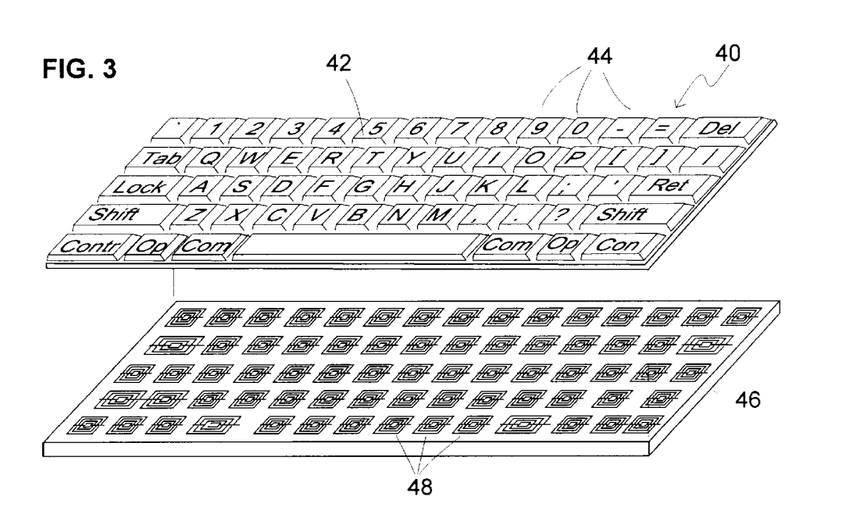
FIG. 3 is a perspective view of an embodiment of a sensor having displaceable keys disposed above a sensor plane composed of a plurality of key elements.

FIG. 3 shows one embodiment of the sensor 40 for sensing the position of the user's finger in real space. The sensor 40 includes a keyboard 42 having a set of displaceable keys 44 disposed above a sensor plane 46. The sensor plane 46 is an at-a-distance sensor capable of imaging a human finger beneath the keyboard 42. In one embodiment, the sensor plane 46 extends across approximately the full extent of the keyboard 42. In this embodiment, the sensor plane 46 includes of a plurality of key elements 48, each of which is used to sense the presence of the user's finger and to determine selection of a corresponding key 44 by the user. In one embodiment, each of the displaceable keys 44 has a corresponding key element 48. In another embodiment, a portion of the displaceable keys 44 each have a plurality of corresponding key elements 48. In yet another embodiment, each of the displaceable keys 44 has a plurality of corresponding key elements 48. Each of the key elements 48 functions both as a capacitive sensor and as an electrical switch. The capacitive measuring function of the key element 48 senses the presence of the user's finger above the key element 48, images the user's finger within the region of the key element 48, and sends a signal to the processor 14 representing the image of the user's finger. 'capacitive' sensing methods include a range of known technologies, such as EF tomography, paracitic capacitance, and ambient noise capacitive coupling. The electrical switch function of the key element 48 determines when the user selects the corresponding key 44 of the keyboard 42 to be input to the electronic system and sends a signal to the processor 14 indicating that a key 44 has been selected. In one embodiment, the electrical switch function is implemented using traditional membrane key switch technology. In another embodiment, the portion of the key element 48 that provides the electrical switch function may coincide with the portion of the key element 48 which provides the capacitive measuring function. In one embodiment in which the two portions coincide, the capacitive measuring function of the key element 48 determines when the user selects the corresponding key 44 of the keyboard 42 by sensing the vertical distance of the user's finger above the sensor plane 46. When the user's finger is within a predetermined distance above the key element 48, the key element 48 is activated and the corresponding key 44 of the keyboard 42 is input to the electronic system.

Figure 4:
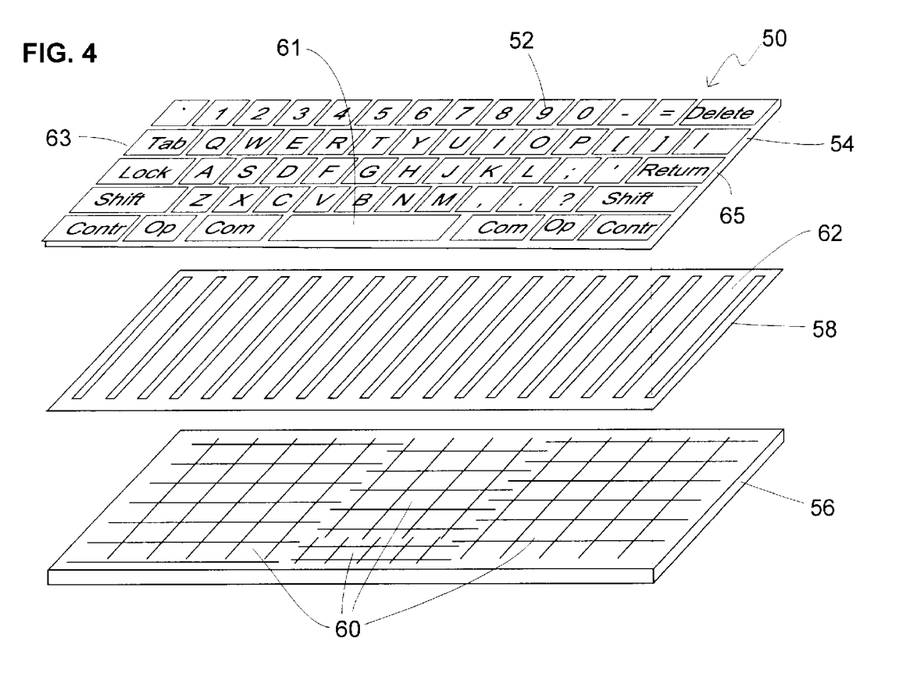
FIG. 4 is a perspective view of another embodiment of a sensor having a keyboard graphic disposed onto a substrate, a sensor plane sensing the position of a user's finger, and a force sensor determining key selection by the user.

FIG. 4 shows another embodiment of the sensor 50 for sensing the position of the user's finger in real space. The sensor 50 includes a keyboard graphic 52 disposed onto a substrate 54, a sensor plane 56, and a force detecting element 58. Both the sensor plane 56 and the force detecting element 58 are disposed below the substrate 54. In one embodiment, the substrate 54 is a near-rigid material, having a durometer of 80 on the shore "A" scale. The sensor plane 56 senses the position of the user's finger. In one embodiment, the sensor plane 56 extends across approximately the full extent of the keyboard graphic 52. In the embodiment shown in FIG. 4, the sensor plane 56 includes four capacitive sensor grids 60. The capacitive sensor grids 60 may utilize any of the capacitive sensor grid technologies (and their equivalents)

which are known in the art. Four independent capacitive sensor grids 60 enables tracking of more than one finger at a time. In one embodiment having four independent capacitive sensor grids 60, one of the capacitive sensor grids 60 is dedicated to determining if the user selects the space bar 61 of the keyboard graphic 52. Four independent capacitive sensor grids (one dedicated to the space bar) are sufficient to track two user fingers in keyboards under five inches in width. The width of the keyboard is the distance from the left side 63 of the keyboard graphic 52 to the right side 65 of the keyboard graphic 52. In other embodiments, the sensor plane 56 may include more or less than four capacitive sensor grids 60. In embodiments utilizing EF tomography, a single capacitive sensor grid 60 may be used for the entire area of the sensor 50.

The force detecting element 58 determines when the user selects one of the keys of the keyboard graphic 52 to be input to the electronic system. When force is applied to the substrate 54, the force detecting element 58 provides contact information to the processor 14 described above and shown in FIG. 1, which indicates that the user has selected a key to be input. The force detecting element 58 is disposed above the sensor plane 56 and may extend across the entire area of the keyboard graphic 52. In one embodiment, the force detecting element 58 is a sheet piezoelectric film having non-conductive regions 62. The non-conductive regions 62 ensure sufficient EF conduction to allow capacitive measurements by the force detecting element 58. This sensor embodiment 50 provides for the independent two-dimensional (XY) tracking of up to two fingers using traditional capacitive sensing techniques in four keyboard regions. This sensor embodiment 50 also provides a single 'contact' output whenever the substrate 54 is pressed at any location.

In another embodiment, the sensor 50 does not include the force detecting element 58, but rather utilizes the substrate 54 to determine when the user selects a key. In this embodiment, the material comprising the substrate 54 is doped with a piezo ceramic material which provides the same functionality as the force detecting element 58. In another embodiment, the keyboard graphic 52 is composed of a single piece of conductive material and key selection is determined by observing the electrical transient that occurs when the user's finger contacts the surface of the keyboard graphic 52. In this embodiment, only one contact of the user's finger with the keyboard graphic 52 may be sensed at a time. In yet another embodiment, a capacitive sensor is used to determine key selection by measuring the vertical distance of the user's finger above the keyboard graphic 52. When the user's finger is within a predetermined distance above the keyboard graphic 52, the selected key is input to the electronic system.

In still another embodiment, the force detecting elements 58 may be used in conjunction with the capacitive sensor which is measuring the vertical distance of the user's finger above the keyboard graphic 52. This embodiment combines the use of force and distance measurement. Including the force detecting element 58 compensates for inaccuracies in determining the exact vertical distance of a user's finger above the keyboard graphic 52 using capacitive technologies when more than one user finger is sensed. The addition of the force detecting element 58 also precludes incidental contact with the capacitive surface which may result in a non-intended key actuation.

Figure 5:
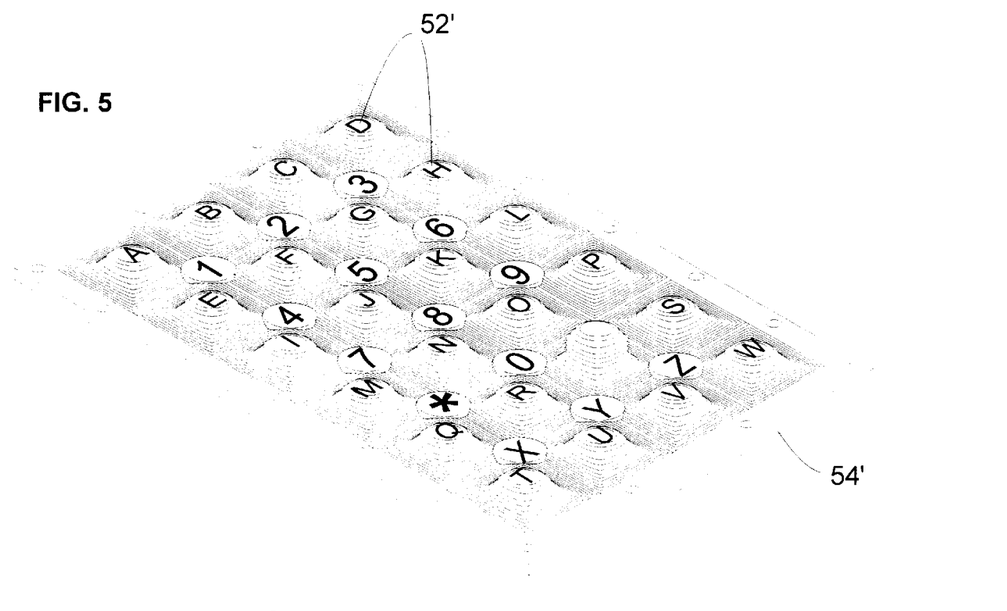
FIG. 5 is a perspective view of an embodiment of a user contact surface having a keyboard graphic disposed onto a substrate composed of a compliant material and having a texture capable of being felt by a human finger.

FIG. 5 shows another embodiment of a keyboard graphic 52' disposed onto a substrate 54' for use in the sensor 50. The substrate 54' is composed of a compliant material and has a texture which can be felt by a human finger. The texture of the substrate 54' provides the user constant touch feedback. In an embodiment in which the user is using the sensor 50 to input data to an electronic system in a virtual or augmented reality application, the texture of the substrate 54' increases the user's perception of control in the virtual environment. In one embodiment, the texture is on the scale of a human finger, i.e. the width of the texture is about the width of a human finger.

In yet another embodiment, the keyboard graphic 52' and substrate 54' may be used with the force detecting element 58, described above and shown in FIG. 4, and with the sensor plane 46, described above and shown in FIG. 3. In this embodiment, the capacitive measuring function of the key elements 48 of the sensor plane 46 sense the position of the user's finger and the force detecting element 58 determines when the user selects one of the keys to be input to the electronic system.

Figure 6:
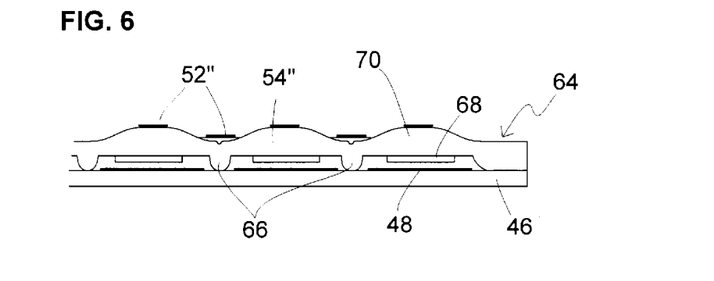
FIG. 6 is a cross-sectional view of another embodiment of a sensor having a contact surface substrate composed of a compliant material and a plurality of at-a-distance capacitive sensors.

FIG. 6 shows another embodiment of a sensor 64 including a substrate 54" with a keyboard graphic 52" disposed thereon and the sensor plane 46 having a plurality of key elements 48. The sensor 64 simulates a keyboard having displaceable keys. The substrate 54" is compliant and is held above the sensor plane 46 by the molded nubs 66. As described above in the discussion of FIG. 3, each of the plurality of key elements 48 is both a capacitive sensor and an electrical switch. The capacitive measuring function of the key elements 48 determines the position of the user's finger above the sensor 64 in at least two dimensions (XY location). Each of the key elements 48 has an associated conductive member 68 for determining when the user selects a key to be input to the electronic system. To select a key, the user presses on the button 70 corresponding to that key. Because the substrate 54" is compliant, pressing on the button 70 forces the corresponding conductive member 68 into contact with the associated key element 48.

Figure 7:
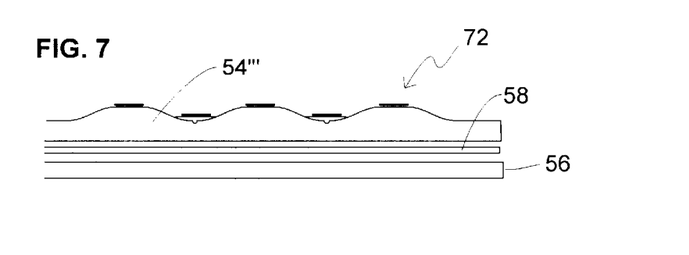
FIG. 7 is a cross-sectional view of another embodiment of a sensor having a compliant contact surface, a sensor plane determining the position of the user's finger, and a contact detection sensor sensing selection of one of the keys by the user.

FIG. 7 shows another embodiment of a sensor 72 having a substrate 54''' made of a compliant material and having a texture capable of being felt by a human finger. The substrate 54''' is disposed over a force detecting element 58 and a sensor plane 56. The force detecting element 58 and sensor plane 56 were described above in the discussion of FIG. 4.

Figures 8, 9:
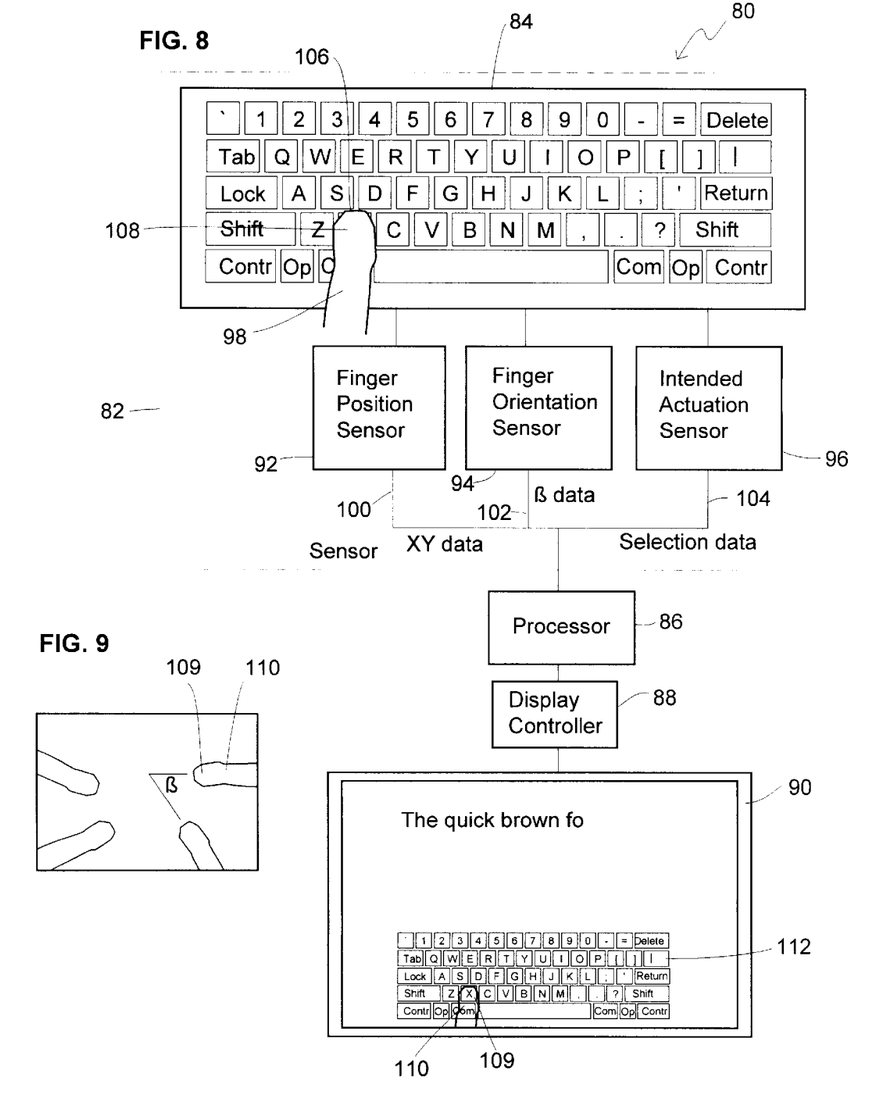
FIG. 8 is a flow diagram of another embodiment of a system for inputting data to an electronic system according to the invention.
FIG. 9 shows the variable angular orientation of a finger-shaped cursor.

FIG. 8 shows a flow diagram of one embodiment of the system 10, described above and shown in FIG. 1, for inputting data to an electronic system. The system 80 includes a sensor 82, a processor 86, a display controller 88, and a head-mounted display 90. The sensor 82 includes a keyboard 84. The keyboard 84 may be a keyboard having displaceable keys or may be simply a keyboard graphic. The sensor 82 is in communication with the processor 86 and includes a finger position sensor 92, a finger orientation sensor 94, and an intended actuation sensor 96. The finger position sensor 92 determines the two-dimensional (XY) location of the user's finger 98 over the keyboard 84 and generates a signal 100 representing the XY location of the user's finger 98. The finger orientation sensor 94 determines the angular orientation $\beta$ of the user's finger 98 with respect to the keyboard 84 and generates a signal 102 representing the angular orientation $\beta$. The intended actuation sensor 96 determines when the user selects one of the keys of the keyboard 82 to be input to the electronic system and generates a signal 104 which represents that a selection was made. In other embodiments, the sensor 82 may be any of the sensors 40, 50, 64, and 72 described above and shown in FIGS. 3, 4, 6 and 7 respectively.

The processor 86 generates a representation of the keyboard 84 in virtual space. The display controller 88 is in communication with the processor 86 and displays the representation 112 of the keyboard 84 on the head-mounted display 90. To input data to an electronic system, the user moves the user's finger 98 across the keyboard 84. The user's finger 98 is detected by the finger position sensor 92 and the finger orientation sensor 94. The forward edge 106 of the user's finger 98 is determined by the sensors 92, 94 and is used to establish an active point 108. The active point 108 is the point of the user's finger 98 which is used by the processor 86 to determine which key of the keyboard 84 the user selects.

Using the XY position data from the finger position sensor 92 and the angular orientation β data from the finger orientation sensor 94, the processor 86 determines the XY location and the angular orientation β of the user's finger in virtual space relative to the representation 112 of the keyboard 84. The processor 86 forms this position and orientation information into a cursor image which is fed to the display controller 88. FIG. 8 shows a finger-shaped embodiment of the cursor 110. The cursor 110 may also be any other desired shape, such as an "X" or a circle. In another embodiment, the display controller 88 superimposes the image of the cursor 110 onto the graphic representation 112 of the keyboard 84, thereby providing a continuous virtual representation of the real interface to the user. The system 80 provides the user with continuous information about the location of the user's finger 98 with respect to each key of the keyboard 84. The user moves the user's finger across the keyboard 84 until the user views the position of the cursor 110 over the desired key of the representation 112 of the keyboard 84. Once the cursor 110 is over the desired key, the user may input that key into the electronic system by selecting the key. Selection of the key is determined by the intended actuation sensor 96. In one embodiment, the user's finger presses against the keyboard 84 to select the key. In another embodiment, the user's finger moves within a predetermined distance above the keyboard 84 to select the key. The processor 86 uses the location of the active point 108 of the user's finger 98 at the instant the intended actuation signal is received from the intended actuation sensor 96, such as the force detecting element 58 described above and shown in FIG. 7, to determine the key to be input to the electronic system. The key input to the electronic system is thereby directly related to the image provided to the user at the time the user selects to input a key.

FIG. 9 further illustrates the finger-shaped embodiment of the cursor 110. The active point 109 of the finger-shaped cursor 110 is located near the tip of the finger-shaped cursor 110, thereby simulating the point of a real finger that a user would use to press a key of a keyboard in the real world. The display angle β is controlled by the processor 86 to simulate the true angle of the user's finger 98 with respect to the keyboard 84.

Referring again to FIG. 8, in one embodiment, the area of the cursor 110 is displayed as semi-transparent, thereby allowing the user to read the graphic legend beneath the cursor 110. In another embodiment, the size of the cursor 110 may be varied. The feature of enabling a user to see which key will be selected without having to view the input device offers a greater degree of physical presence in a virtual world and provides a higher quality interface to the user than traditional input devices. The cursor 110 representing the location of the user with respect to the input device is instantly locatable by the user and provides the user a clear mental mapping between the real and virtual worlds.

In another embodiment, the sensor 82 senses the position of more than one user finger. In this embodiment, more than one finger-shaped cursor 110 may be displayed simultaneously.

Figure 10A:
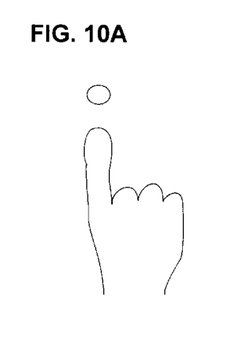
FIGS. 10A and 10B show a method for toggling between two input modes in an electronic system.
Figure 10B:
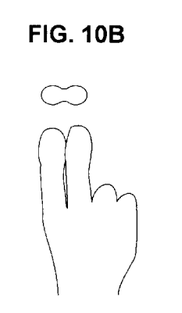

FIGS. 10A and 10B demonstrate a method for toggling between two input modes in an electronic system having more than one input mode. For example, an electronic system may be able to receive data through a mouse input mode and a keyboard input mode. In this embodiment, the sensor 12 of the system 10 described above and shown in FIG. 1, is capable of distinguishing between a single user finger and a plurality of user fingers. FIG. 10A shows the position of the user's hand during the first input mode and the proximate image perceived by the processor 14. When the sensor 12 senses only the single user finger, the processor 14 places the electronic system in the first input mode. In one embodiment, the first input mode is a keyboard input mode. FIG. 10B shows the position of the user's hand during the second input mode and the proximate image perceived by the processor 14. When the sensor 12 senses a plurality of user fingers, the processor 14 places the electronic system in the second input mode. In one embodiment, the second input mode is a mouse input mode. It is the difference, especially the transient difference between the two perceived images shown in FIGS. 10A and 10B, that is used by the processor 14 to differentiate between the user's desire to operate in one of two input modes.

Figure 11:
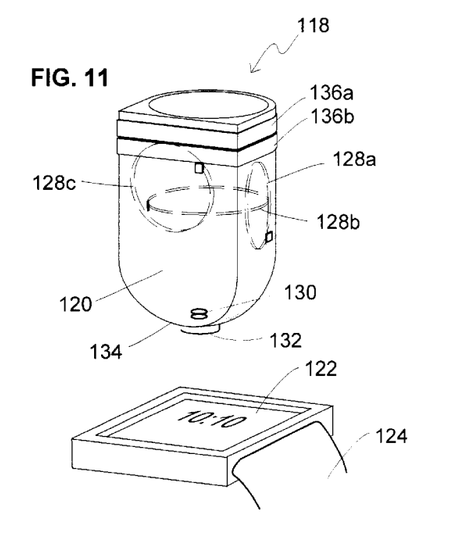
FIG. 11 shows a perspective view of an embodiment of a finger-mounted virtual input device having tuned inductive coils.

FIG. 11 shows another embodiment of a sensor 119 for sensing the position of the user's finger in real space. The sensor 119 includes a finger-mounted device 120 and is capable of being used in keyboard and mouse input modes. The sensor 119 may be used in the method for toggling between two input modes described above. The sensor 119 is implemented with a magnetic field locally induced by a base unit 122. To move between different input options, the user moves the finger-mounted device 120 relative to the base unit 122. As the user's finger moves relative to the user's wrist (of either hand) the magnetic field may also be generated by a base unit 122 that is contained in a wrist band 124 located on one of the user's wrists. In one embodiment, the base unit 122 is mounted in a watch-like device and is worn on the same hand as the finger-mounted device 120. Because the user perceives the keyboard only in virtual space, because all motions may be relative to any given key within that virtual space, and because accuracy is not required (only a consistent inaccuracy that can be adjusted for), it is possible to implement a truly virtual keyboard and cursor control with the sensor 119. For example, if the system is non-linear, as long as it is non-linear in a consistent manner, the non-linear response can be linearized in software.

Figure 12:
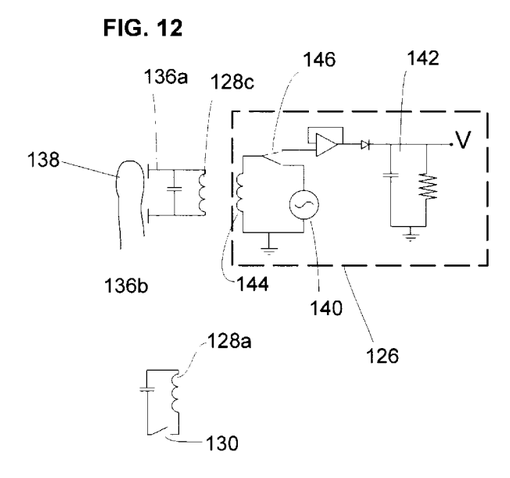
FIG. 12 shows a schematic diagram of one embodiment of a base transceiver for use with the input device of FIG. 11.

The base unit 122 includes a magnetic driver and receiver. FIG. 12 shows one embodiment of a base transceiver 126 which functions as a magnetic driver and receiver. The base transceiver 126 is located within the base unit 122. Referring again to FIG. 11, in one embodiment, the system operates without a battery in the finger-mounted device 120 by using at least two tuned inductor-resistor-capacitor (LRC) circuits. Three coils 128a, 128b, and 128c are disposed within the finger-mounted device 120 and are orthogonally oriented. Each of the three coils 128a, 128b and 128c are tuned to different distinct frequencies using standard RC techniques. The three coils 128a, 128b, 128c are used to determine the position of the finger-mounted device 120 relative to the base unit 122. In one embodiment, the base unit 122 includes a separate base transceiver 126 for each of the three coils 128a, 128b, 128c. Each coil is in communication with its corresponding base transceiver 126 through magnetic field coupling.

FIG. 12 shows a schematic of a base transceiver 126. The base transceiver 126 includes a magnetic field source driver 140, a field sensing receiver 142, a switch 146 and a base coil 144. Each of the three base coils 144 of the base transceivers 126 have orthogonal major axes, yet the base transceivers 126 may otherwise be comprised of the same circuitry. The magnetic field source driver 140 and the magnetic field sensing receiver 142 are alternately coupled to the base coil 144 through the switch 146. The switch 146 toggles the functionality of the base transceiver 126 from that of a magnetic field producer to a magnetic field receiver through its associated base coil 144.

During operation, a first axis of the base transceiver 126 produces a magnetic field through the magnetic field source driver 140, thereby charging the coils 128a, 128b and 128c as a function of their degree of co-linearity with the transmitting base transceiver 126, their relative frequencies, and their distance from the base transceiver 126. Next, the switch 146 toggles and the operation of the base transceiver 126 changes. The field sensing receiver 142 measures the decay as the energy stored in the coils 128a, 128b, and 128c discharges. This process is repeated for each major axis, thereby providing the data necessary to calculate the position and angle of the finger-mounted device 120 with respect to the base unit 122 in three dimensions.

In another embodiment, the base unit 122 includes a single base transceiver 126 for the three coils 128a, 128b, 128c. In this embodiment, the base transceiver 126 includes three independent orthogonally-oriented base coils 144, one for each of the three axes. A portion of the electronics forming the base transceiver 126 is multiplexed between operating on each of the three base coils 144 independently.

Coil 128a is in series with a normally closed switch 130 that is opened by pressing the button 132 located at the tip 134 of the finger-mounted device 120. The purpose of the button 132 is to allow the user to select an input option. To select an input option, the user simply presses the button 132. The transient response detected by the magnetic field sensing receiver 142 of the base transceiver 126 when the switch 130 is opened informs the system that the button 132 has been depressed and that the user has selected an input option, i.e. selected a key. While the button 132 is depressed, the coil 128a is inoperable. The inoperability of the coil 128a does not cause a problem for the system because the system is not expected to operate as long as the user maintains actuation of a specific input option, i.e. a specific key.

The third coil 128c is electronically coupled to a finger sensor 136. The finger sensor detects the presence or absence of an additional user finger. To toggle between two different input modes, the user may place a second finger adjacent the finger sensor 136 or remove the second finger from being adjacent to the finger sensor 136, depending on the current location of the second finger. When the additional finger is absent, the electronic system is placed in the first input mode. When the additional finger is present, the electronic system is placed in the second input mode.

Figure 13:
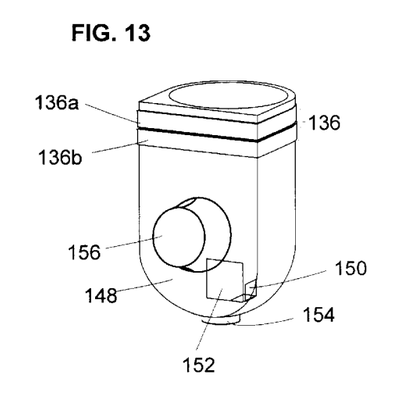
FIG. 13 shows a finger-mounted virtual input device implemented with magnetotransistors.

In one embodiment, the finger-mounted device 120 includes two finger sensor plates 136a, 136b. When the additional finger is not contacting the contact sensor plates 136a and 136b, the electronic system is placed in the first mode. When an adjacent finger 138 contacts sensor plates 136a and 136b, the capacitance of the body provides a transient response that indicates that the user wants the electronic system placed in the second input mode. In one embodiment, the location of the finger sensor plates 136a and 136b is slightly distal to the first phalangeal joint of a user's finger when the finger-mounted device 120 is worn on one of the user's fingers. The two use modes may be further identified by the relative measurement provided at either side of transient FIG. 13 shows another embodiment of a finger-mounted virtual input device 148 capable of being used in multiple input modes. The input device 148 is implemented with magnetotransistors. The finger-mounted device 148 includes at least two magnetotransistors 150 mounted to a hybrid integrated circuit (IC) 152. The magnetotransistors 150 measure the displacement of the input device 148 within the Earth's magnetic field along two axes. To increase robustness in free space, in one embodiment a third magnetotransistor is used. Similar to the input device 120 described above and shown in FIG. 11, a button 154 located at the tip of the input device 148 provides intended actuation data indicating that the user selected one of the input options. Upon start-up, a first press of the button 154 initializes the finger-mounted input device 148 by measuring the local magnetic field and establishing a use orientation for that particular session. Communication with the processor 14 (shown in FIG. 1) is effected through a body local area network (LAN) driven by the hybrid IC 152 and powered by a battery 156.

In one embodiment, the input device 148 also includes the sensor 136 (shown in FIG. 11) located on the side of the finger-mounted device 148, and proximate to an adjacent finger of the user's hand. The sensor 136 determines when the user's adjacent finger is in physical contact with the finger-mounted device 148, as described above in the discussion of FIG. 11. Placing an adjacent finger next to the sensor 136 may be used for various control features. In one embodiment, placing an adjacent finger next to the sensor 136 toggles the electronic system from a first input mode to a second input mode.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A method for toggling between a first input mode and a second input mode in an electronic system, comprising the steps of:

providing an electronic system having a first input mode and a second input mode;

providing a sensor in communication with the electronic system, the sensor being capable of distinguishing between a single user finger and a plurality of user fingers;

placing the electronic system in the first input mode upon sensing only the single user finger; and placing the electronic system in the second input mode upon sensing the plurality of user fingers.

2. The method of claim 1 wherein the step of providing an electronic system further comprises the step of providing an electronic system having a keyboard input mode and a mouse input mode, wherein the step of placing the electronic system in the first input mode further comprises the step of placing the electronic system in the keyboard input mode, and wherein the step of placing the electronic system in the second input mode further comprises the step of placing the electronic system in the mouse input mode.

* * * * *